United States Patent [19]

Royal

[11] Patent Number: 5,446,878
[45] Date of Patent: Aug. 29, 1995

[54] METHOD FOR SELECTIVELY ENABLING SUBSET OF EMBEDDED EVENT-MAKING INSTRUCTIONS AND SELECTING TYPES AND ITEMS OF EVENT-BASED DATA TO BE COLLECTED PER ENABLED INSTRUCTION

[75] Inventor: Philip K. Royal, Merrimack, N.H.

[73] Assignee: Digital Equipment Corporation, Maynard, Mass.

[21] Appl. No.: 326,815

[22] Filed: Oct. 20, 1994

Related U.S. Application Data

[63] Continuation of Ser. No. 52,227, Apr. 22, 1993, abandoned, which is a continuation of Ser. No. 485,372, Feb. 26, 1990, abandoned.

[51] Int. Cl.⁶ .............................................. G06F 11/30
[52] U.S. Cl. .................................. 395/180; 364/267; 364/267.1; 364/267.4; 364/275.5; 364/DIG. 1
[58] Field of Search ............... 395/575, 375, 600, 700; 371/19

[56] References Cited

U.S. PATENT DOCUMENTS

| | | | |
|---|---|---|---|
| 3,906,454 | 9/1975 | Martin | 395/575 |
| 4,462,077 | 7/1984 | York | 395/650 |
| 4,706,080 | 11/1987 | Sincoskie | 340/825.02 |
| 4,802,165 | 1/1989 | Ream | 371/19 |
| 4,813,009 | 3/1989 | Tallman | 395/500 |
| 4,845,615 | 7/1989 | Blasciak | 395/400 |
| 4,937,740 | 6/1990 | Agarwal et al. | 395/425 |
| 5,016,244 | 5/1991 | Massey, Jr. et al. | 370/16 |
| 5,018,137 | 5/1991 | Backes et al. | 370/85.13 |
| 5,119,377 | 6/1992 | Cobb et al. | 371/19 |

OTHER PUBLICATIONS

LeBlanc, "Event-Driven Monitoring of Distributed Programs", School of Information and Computer Science, 1985, pp. 515–522.
Miller, "A Distributed Programs Monitor for Berkeley Unix", Computer Systems Reserch Group, 1985, pp. 43–54.
Cooper, "Pilgrim: A Debugger for Distributed Systems", Cambridge University Computer Laboratory, 1987, pp. 458–465.
Miller, "IPS: An Interactive and Automatic Performance Measurement Tool for Parallel and Distributed Programs", University of Wisconsin, 1987, pp. 482–489.
Weald, "Data Monitor Facility", Nov., 1987, pp. 1–11.
BGS Systems, "Crystal Performance Evaluator for DB2", Crystal Product Family, 1988, pp. 1–2.
Monitor, *General Information Manual for Monitor for CICS TM*, Landmark Systems Corporation, 1986, pp. 33–38, 49–62, 91–97.
Rullo et al., "An Automatic Physical Designer for Network Model Databases", IEEE Transactions on Software Engineering, Sep. 1988, vol. 14, No. 9, New York.
Finkelstein et al., "Physical Database Design for Relational Databases", ACM Transactions on Database Systems, vol. 13, No. 1, Mar. 1988, pp. 91–128.

*Primary Examiner*—Thomas G. Black
*Assistant Examiner*—Paul Harrity
*Attorney, Agent, or Firm*—Fish & Richardson

[57] ABSTRACT

An application event collector which is embodied in computer software that collects event-based data. The collector follows a process which includes the steps of: (a) storing definitions of event-marking instructions that have been embedded in the software application, each instruction being capable, when enabled, of collecting event-based data, and the definitions identifying the software application in which the instructions have been embedded and the type of data collected by the instructions; (b) selecting, prior to or during execution of the application, a subset of the event-marking instructions and enabling those instructions; and (c) detecting the enabled event-marking instructions, during execution of the software application, and collecting the data specified by the enabled instructions. The application is divided into layers, each of which may have event-marking instructions embedded in it. These event marking instructions are capable of selectively collecting a some or all of a number of data items and a user can select which of these data items are to be collected. The user can also disable collection of data items.

9 Claims, 12 Drawing Sheets

Microfiche Appendix Included
(14 Microfiche, 660 Pages)

METHOD FOR SELECTIVELY ENABLING SUBSET OF EMBEDDED EVENT-MAKING INSTRUCTIONS AND SELECTING TYPES AND ITEMS OF EVENT-BASED DATA TO BE COLLECTED PER ENABLED INSTRUCTION

This is a continuation of application Ser. No. 08/052,227, filed Apr. 22, 1993, now abandoned, which was a continuation of Ser. No. 07/485,372, filed Feb. 26, 1990, now abandoned.

Reference to Microfiche Appendix

The application includes a microfiche appendix pursuant to 37 CFR §1.96(b) containing 14 microfiche having 660 frames.

BACKGROUND OF THE INVENTION

The invention relates to software application event collection systems.

Most software application event collection systems are "timer based," i.e., they collect data from an application program at specified time intervals. Because random parts of the application are executed at any given time, the actual frequency of events occurring in the collected data must be calculated as an average or estimated frequency. On the other hand, so-called "event based" evaluation systems gather data at specified locations in the application and thus collect and report on the actual frequency of events, not on an estimated frequency. Software debugging systems, for example, are one type of event based evaluation systems. In debugging systems, the application to be debugged is "instrumented" at points of interest with calls to service routines in another application which does the actual debugging. The points of interest are often referred to as "breakpoints" and include, for example, the beginnings and endings of subroutines. Each time the instrumented subroutine executes, the data related to the event is collected as part of the evaluation.

SUMMARY OF THE INVENTION

In general, the invention features an application event collector which is embodied in computer software that collects event-based data for a number of purposes described below in connection with a presently preferred embodiment. The collector follows a process which includes the steps of: (a) storing definitions of event-marking instructions that have been embedded in the software application, each instruction being capable, when enabled, of collecting event-based data, and the definitions identifying the software application in which the instructions have been embedded and the type of data collected by the instructions; (b) selecting, prior to or during execution of the application, a subset of the event-marking instructions and enabling those instructions; and (c) detecting the enabled event-marking instructions, during execution of the software application, and collecting the data specified by the enabled instructions.

In preferred embodiments, the application is divided into layers, each of which may have event-marking instructions embedded in it. These event marking instructions are capable of selectively collecting a some or all of a number of data items and a user can select which of these data items are to be collected. The user can also disable collection of data items. To these ends, the definitions of the event-marking instructions include identification of the software layer in which the instruction is embedded and the definitions include classes of event-marking instructions and data items that may be selected.

The collector provides several benefits, including a "real-time" collection capability, i.e., collection of event data from an application as the application is running in its intended environment. Real-time collection is contrasted with "modelled" evaluations, i.e., collection of event data from an application as the application is running in a simulated environment. This real-time collection capability allows recording of only those events specified by the user via the schedule user interface and the collector is able to capture the actual frequency of the data at runtime. Thus, significant runtime overhead (both computational and storage related) is eliminated. Likewise, the collector is able to collect event-based data from any combination of layers within a software application.

The collector further provides collection of event-based data that can serve as the basis for tuning software application runtime performance. For example, the invention can provide the "workload analysis" used to fine tune a database as described in connection with the Physical Database Designer of a application Ser. No. 07/485,376, now abandoned, by Michael E. Gioielli et al. entitled PHYSICAL DATABASE DESIGN SYSTEM and filed on even date with this application.

The collector further provides a basis for planning hardware resources (also referred to as "capacity planning"). That is, the collector can determine the computational and storage needs of an application. The resulting data can be input, for example, to the DECcp version 1.1 capacity planning product.

The collector further provides a basis for debugging applications and logging errors within the applications. And finally, the collector is designed to operate with minimal performance impact on the application from which it is gathering data, and also to allow users to customize what data is collected. Thus, it can be used in both production and development environments.

Other advantages and features will become apparent from the following description, and from the claims.

DESCRIPTION OF THE PREFERRED EMBODIMENT

Figure 1:
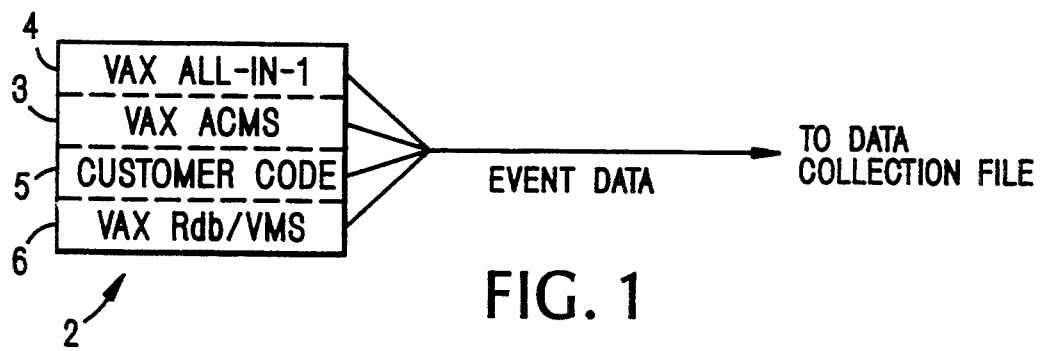
FIG. 1 is a block diagram of a layered application.

The application event collector of the present invention (herein referred to as the "collector") is embodied in a layered software application that collects, formats, and reports on the event based data it gathers from other layered software applications that contain service routine calls to collector. An application is made up of one or more "layers." For example, an application layer can be application code (e.g., customer code) or layered product code (e.g., VAX ACMS, VAX Rdb/VMS, 3rd party software, etc.). Referring to FIG. 1, an application 2 having four layers is shown in block diagram form. The arrangement of the layers can be hierarchical, e.g., beginning with a VAX All-in-1 layer 3, and proceeding through a VAX ACMS (Application Control Management System) layer 4, a customer code layer 5, and a VAXRdb/VMS database layer 6. The source code in each layer in the application must be instrumented with calls to the collection service routines described below in order to collect event-based data from the layer. Once the layers are instrumented, the user can manage data collection via the schedule user interface described below in connection with FIG. 2.

Since the goal of operating with minimal impact on the application is as important when data collection is turned off as when it is turned on, the source code in each layer of the application determines which events are currently being collected by various "event collection flags." If, for example, an event collection flag is set, then the application layer issues a call to a collection service routine. Otherwise, the application layer does not issue a call to the service routine, and, thus minimizes the overhead incurred when data collection is turned off. Specifically, the overhead is limited to two instructions: one compare instruction to determine if the flag is set and one branch instruction to continue execution of the application layer.

The collector further achieves the objective of minimizing overhead by providing a system that allows a user to determine which layers he can collect data from, and what events and data items are available within each layer. Thus, the user can collect data from only those layers that he is interested in. For example, if the user is interested in tuning his current VAX Rdb/VMS database, he can specify that he wants data collected from the Rdb/VMS database layer of the application only. To further minimize overhead, the user can specify one or more of various event "classes" to be collected within each layer. For example, if the user is interested in collecting only workload data from the VAX Rdb/VMS layer, he can specify a class of data that includes only workload events and data items.

The user can then use the collector to determine what applications are currently running on a computer system, e.g., a VAXcluster. Having determined which applications are running, the user can schedule a data collection that he specified above. In addition, he can schedule how long to collect the data specified and where to store the data that is collected, as well as specific applications from which to collect the data. For example, if the user knows what applications interface with the VAX Rdb/VMS database layer he is interested in, then he can specify data collection from those applications only. Also, if he knows that the applications from which he wants to collect data typically run between 8 am and 5 pm, then he can limit the duration of the collection accordingly.

Thus, the collector is a system in which an application programmer creates a "facility definition", i.e., defines a number of events, a number of data items associated with each event, and a number of classes of events and data items that his application contains. The programmer does this in addition to instrumenting the application code with the various service routine calls that are common to event based evaluation systems. Once the facility definition is complete, a user can create a "facility selection" i.e. select events, data items, and classes from among a number of facility definitions for a number of applications. The user can also select when to turn a facility selection on (i.e., when to begin collecting data for a selected application) and when to turn a facility selection off (i.e., when to stop collecting data for a selected application). One advantage of this approach is that the application for which the facility selection is turned off incurs no overhead, i.e., the application does not actually execute the service routine calls despite the fact that the application itself is fully instrumented.

Figure 2:
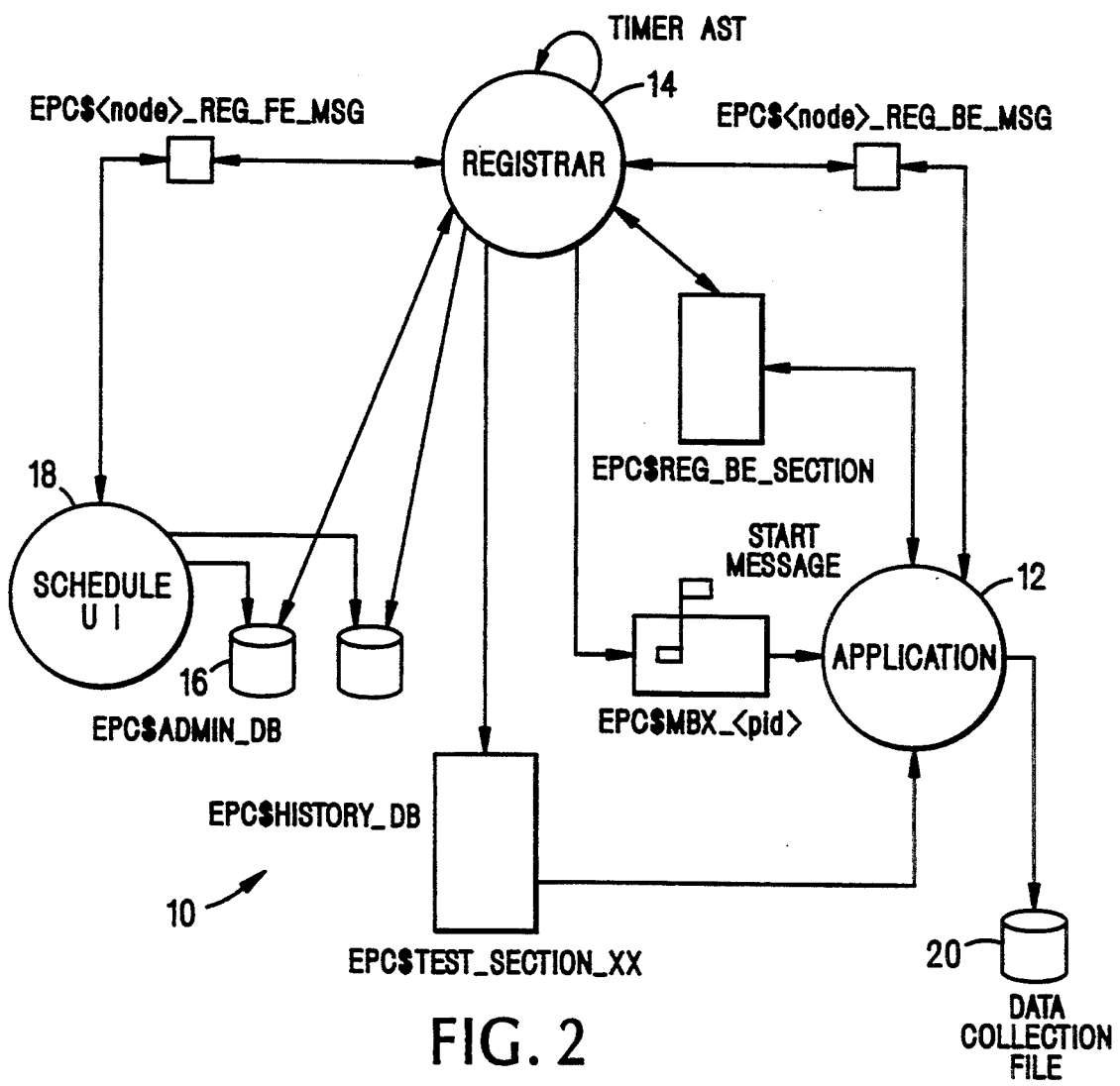
FIG. 2 is a block diagram of the components of an application event collector according to the present invention.

Referring to FIG. 2, a collector 10 includes a software application having a number of application layers 12. One example of an application layer 12 is the software for a bank automatic teller machine (ATM). Each application layer 12 includes a number of "events" i.e., the occurrence of one or more operations. Events are divided into two types: those that have a start and an end (referred to as "duration" events) and those that simply occur (referred to as "point" events). Examples of a duration event are basic ATM transactions such as checking a balance, depositing funds, or withdrawing funds. One example of a point event in an ATM application layer is the execution of an error handling procedure.

Each event in the application layer 12 is further associated with a number of data items, e.g., the standard resource utilization items listed in Table 1 below. It is the data relating to each of these items that is collected at the execution of each event by the collector, if the standard resource utilization items are defined for each event in the facility definition.

TABLE 1

| | |
|---|---|
| BIO | Number of buffered I/O operations |
| DIO | Number of direct I/O operations |
| PAGEFAULTS | Number of hard and soft page faults |
| PAGEFAULT_IO | Number of hard page faults |
| CPU | Amount of CPU time |

TABLE 1-continued

| | |
|---|---|
| CURRENT_PRIO | Current priority of the process |
| VIRTUAL_SIZE | Number of virtual pages currently mapped for the process |
| WS_SIZE | Current working set size |
| WS_PRIVATE | Number of pages in the working set that are private to the process |
| WS_GLOBAL | Number of pages in the working set that are shared among processes |

In order to collect the data described above, the application layer 12 is connected to a registrar process 14 which handles communication between the application layer and an administration database 16 that contains a description of the events and data items to be collected for the application layer. The events and data items for the application layer 12 are defined in a "facility definition" which stored in the administration database 16. Likewise, a "facility selection" (also stored in the administration database 16) defines subsets of the events and data items defined in the facility definitions in order to allow a user to customize the data that is collected.

The application layer 12 is further connected via the registrar 14 to a schedule user interface 18, which is also connected to the administration database 16. Communication between the schedule user interface 18, the administration database 16, the registrar 14, and the application layer 12 controls, for example, when a facility selection is turned on, i.e., when a user schedules a collection that tells the application layer to start collecting data, and when a facility selection is turned off, i.e., when a user cancels a collection before its scheduled end time. One particular advantage of this arrangement is that it minimizes any reduction in performance of the application layer 12 when data is not being collected.

Finally, the collected data, i.e., the data associated with the events and data items specified in the facility selection, is stored in a data collection file 20. The user can format the data in the data collection file 20 and produce various reports as described later in the specification. First, however, an overview of the collection process, including the steps taken by the application layer programmer and the steps taken by the user, is provided below in connection with the flow chart of FIG. 3.

Figure 3:
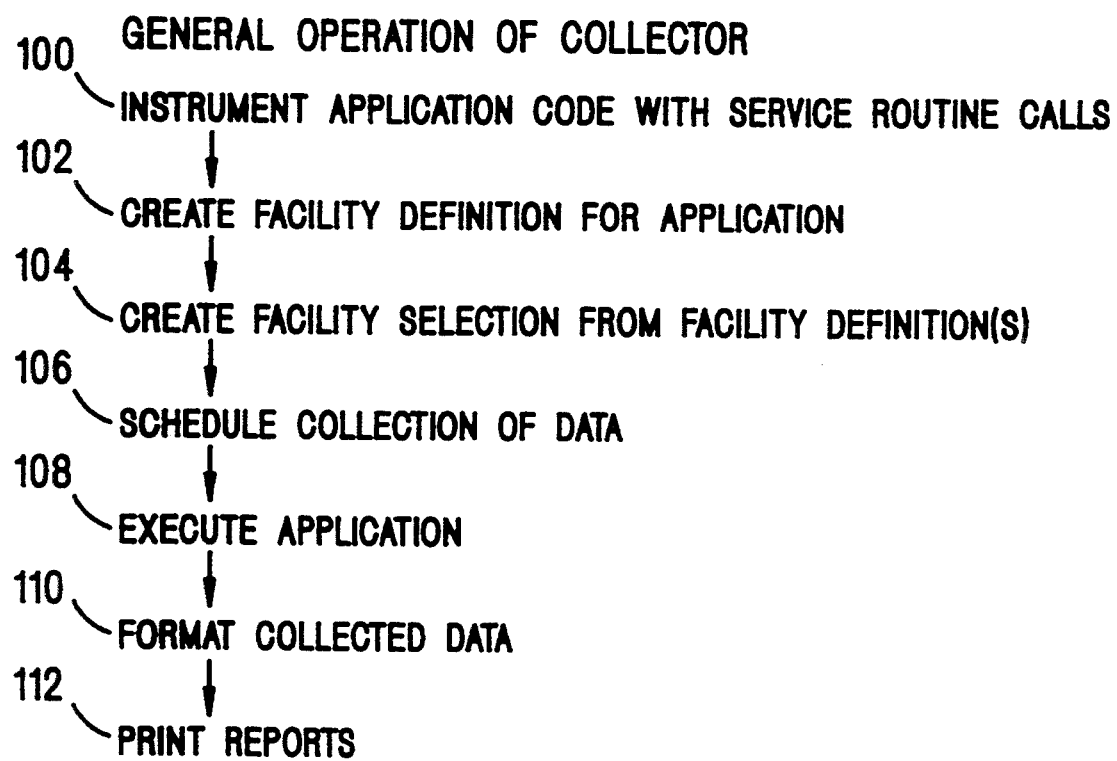
FIG. 3 is a flow chart describing the general operation of the application event collector.
Figure 4:
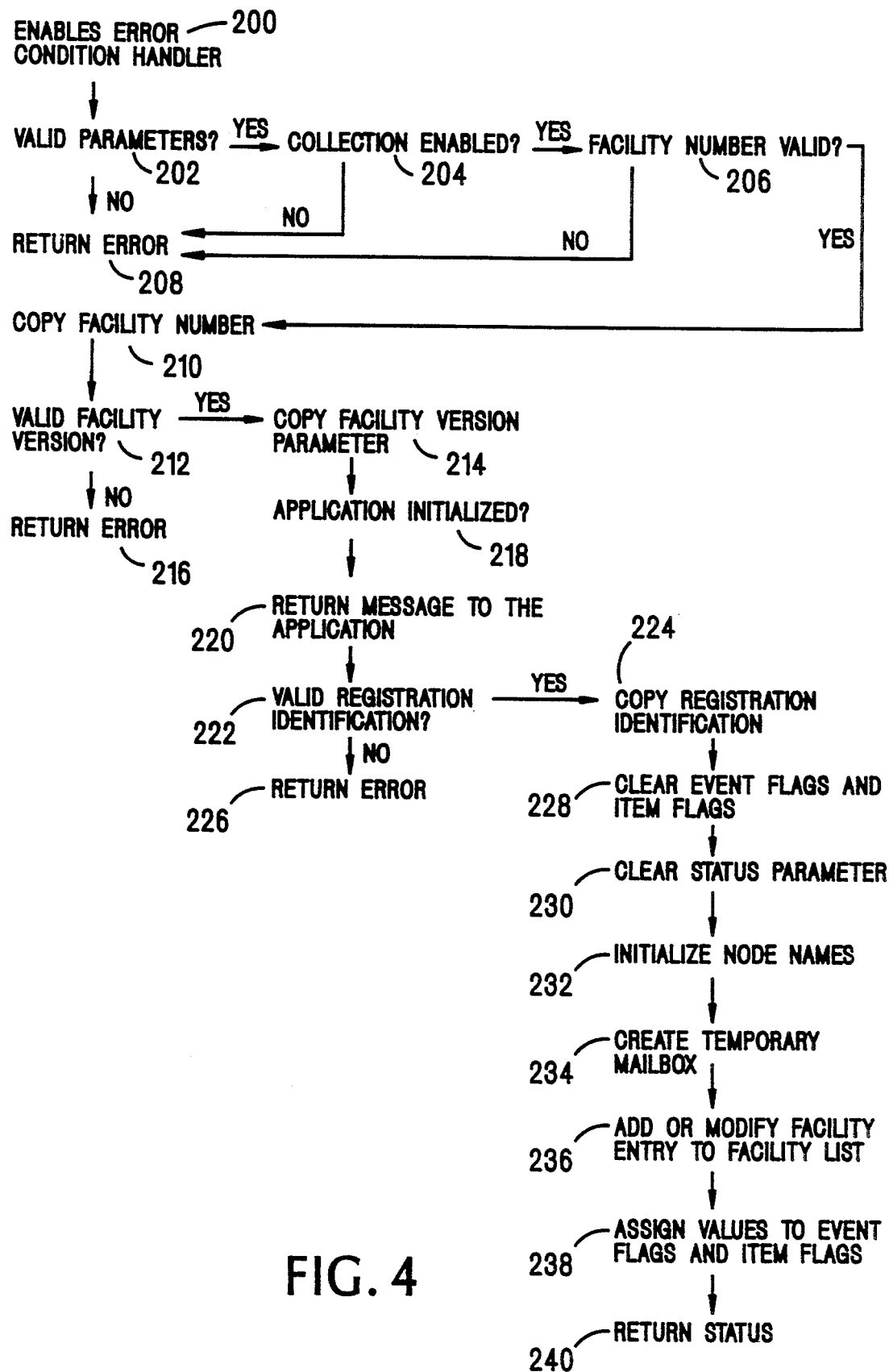
FIG. 4 is a flow chart describing the operation of a service routine call of Collector, i.e., INIT.
Figure 5:
FIG. 5 is a block diagram of a data structure maintained by INIT.

Referring to FIG. 3, an application programmer "instruments" his application layer 12 with service routine calls that collect data and store it in the data collection file 20 (step 100). Such calls indicate, for example, when an application layer is initialized, when an event begins, and when an event ends. When executed, the application layer 12, determines which events and data items are selected for the application layer 12, and begins the collection. Also at the start of a collection, the registrar 14 manages communications with various subroutines to set up records in the data collection file 20 in which to store the data which the application layer 12 is collecting.

To the above ends, the programmer creates a "facility definition" for the application layer 12 and stores the definition in the administration database 16 (step 102). Users view these facility definitions to assist them in scheduling data collection. From the information in the facility definitions, a user then creates a "facility selection" in which he names the facilities and classes of events and items for each facility from which he wishes to collect data (step 104). Having completed his selection, the user next schedules data collection through the schedule user interface 18 (step 106), i.e., references the facility selection created in step 104 or a previously created facility selection. The user then schedules a collection via the schedule user interface 18 and executes the application layer 12, which causes the application layer and registrar 14 to collect data for the events defined in step 100 and to store the data in the data collection file 20 (step 108). Finally, the user formats the data stored in the data collection file 20 (step 110), and prints the formatted data in report form (step 112). A detailed description of each of these steps is provided below.

Instrumenting the Application Code

As noted above in connection with FIG. 3, in the first step of the data collection process, the application programmer instruments the source code of application layer 12 with service routine calls. Table 2 below lists some of the service routine calls recognized by Collector, each of which serves a different purpose. For example, the INIT service routine call identifies one application as a layer (also referred to as a facility) and informs the registrar process 14 that the layer is able to collect data. Once the application layer is so identified, the various EVENT service routine calls define the events within the application layer, i.e., the occurrence of a point event or the start and end of a duration event. Each call from the application layer 12 via the Collector service routines to the registrar 14 further involves a number of error checks to ensure that the application layer passes all of the data necessary for the registrar to conduct the data collection. These and other features of the service routine calls is provided below in connection with FIGS. 4-13.

TABLE 2

| | |
|---|---|
| END_EVENT | Records the end of a duration event to the data collection file |
| END_EVENTW | Records the end of a duration event to the data collection file and waits for processing to complete before it returns |
| EVENT | Records the occurrence of a point event to the data collection file |
| EVENTW | Records the occurrence of a point event to the data collection file and waits for processing to complete before it returns |
| INIT | Registers an application layer (facility) with the registrar to enable data collection from the layer |
| START_EVENT | Records the start of a duration event to the data collection file |
| START_EVENTW | Records the start of a duration event to the data collection file and waits for processing to complete before it returns |

INIT Service Routine Call

The first of the several service routine calls described herein is INIT which is instrumented at the prior to the first event for each application layer 12. Its purpose is to inform the registrar 14 that the application layer 12 is running and is able to collect data. An example of the INIT service routine call instrumented in a section of application code is shown below in "Code Example 1".

CODE EXAMPLE 1

```
/***********************************************************************
****                                                       .
*       Facility:        DB - Database Facility
*
*       Module  :        DB$TRANS.C Abstract:        Module handles transactions for use as a
                         basic code example for issuing DECtrace
                     - - service routine calls.
*
*
*       Creation:        28-Jun-1989
*
***********************************************************************
**/

/***********************************************************************
*****           Header Files
***********************************************************************
**/
#include <stdio.h>                      /* C standard I/O            */
#include <ctype.h>                      /* C type library            */
#include <stdlib.h>                     /* C standard library        */
#include <descrip.h>                /* VMS Descriptors             */

/***********************************************************************
***
**      Macro Files
***********************************************************************
**/
#define FAC_NO 123                      /* Facility number */
#define TRNAS_EVENT_ID 1         /* Transaction event id */

/***********************************************************************
***
**      Variable declarations.
***********************************************************************
**/
static $DESCRIPTOR(s_fac_ver,"V1.0-0");

/***********************************************************************
***
        External References
***********************************************************************
**/
globalvalue EPC$_NOTINSTALL;            /* DECtrace not installed message
*/
globalvalue EPC$_SUCCESS;        /* DECtrace success status */
                                        /* Facility version string */
/***********************************************************************
***
**      Forward References
***********************************************************************
***
int db$$main(void);                     /* Main program entry point   */
```

```c
int transaction(void);          /*Transaction function       */

/*********************************************************************
***
*
*   Main Program.
*
*********************************************************************
**/
int db$$main ()
main_program
    {
      int status;                /* Status Code */

/* Register with DECtrace */
                status = epc$init(1,        /* EFN */
                    FAC_NO,        /* Facility number */
                    &s_fac_ver,    /* Facility ver. string */
                    0,             /* Registration id string */
                    0,             /* Event flags structure */
                    0,             /* Event item flags structure */
                    0,             /* IOSB */
                    0,             /* AST address */
                    0,             /* AST parameter */ if ((status ! = EPC$_SUCCESS) && (status !=
EPC$_NOTINSTALL))
                    {
                       return (status);
                    }
                status = transaction();

return (TRUE);

; /* End db$main */

/*********************************************************************
***
*
*              Transaction function.
*
*********************************************************************
**/
int transaction (void)
    {
                int     event_handle;   /* Event handle */
                int     status;         /* Status Code */

/* Start of the TRANSACTION event */

/* Call EPC$START_EVENT to log the start of the transaction event */
status = epc$start_event(
                    1,          /* EFN */
                        FAC_NO, /* Facility number */
```

```
                                    TRANS_EVENT_ID,    /*
Transaction event id */
                                    &event_handle,     /* Event
handle */
                                    0,     /* No thread context
var */
                                    0,     /* Facility items
rec. buffer */
                                    0,     /* Completion status
*/
                                    0,     /* AST address */
                                    0,     /* AST parameter */ return (status);

/* End of the TRANSACTION event */

/* Call EPC$START_EVENT to log the start of the transaction event */
status = epc$start_event(
                                    1,     /* EFN */
                                    FAC_NO,    /* Facility number */
                                    TRANS_EVENT_ID,/* Transaction
event id */
                                    &event_handle, /* Event handle
from start event */
                                    0,  /* No thread context var */
                                    0,  /* Facility items rec.
buffer */
                                    0,  /* Completion status */
                                    0,  /* AST address */
                                    0,  /* AST parameter */ return (status);
    return (TRUE);

}; /* End transaction function */
$ Collect
!
! Create a facility definition for the DB facility
!
create definition db 123/version="V1.0-0"/event=(TRANSACTION)/replace
!
!
! Show the facility definition for the DB facility
!
show definition db/format=full
!
!
! Create a facility selection for the DB facility
!
create selection code_example1_sel/fac=(db)/replace
!
!
!
! Schedule data collection, referencing the facility selection
! CODE_EXAMPLE1_SEL.  Collection will start NOW and end in 2 hours.
!
```

```
schedule collection code example1_coll dcf.dat-
/selection=code_example1_sel-
/duration=02:00:00.00-
/nocluster
!
!
! Run the program and collect the data.
!
$ Run DB$TRANS.EXE
!
!
$ Collect
!
! Format the data into an Rdb/VMS database.
!
format dcf.dat code_example1_db
!
!
!
! Generate a DETAIL report.
!
report/type=DETAIL/facility=db code_example_db
```

The basic operation of INIT is to register the facility with the registrar 14, i.e., inform the registrar that the application layer 12 is running and is enabled to collect data. INIT is illustrated in the flow chart of FIG. 4. First, INIT enables an error condition handler (step 200) to respond to any errors in the list of parameters passed by the application layer 12 when it calls the routine. Next, INIT validates the contents of one or more of the parameters in the list of parameters (step 202), makes certain a collection has not been previously disabled for the application due to an unexpected error, determines whether a collection is enabled (step 204), and determines if the contents of the facility number parameter passed by the application layer 12 are valid (step 206). If the result of any of the tests in steps 202-206 is false, an error is returned to the application layer 12 (step 208). Otherwise, if the result of each of the tests in steps 202-206 is true, then INIT copies the contents of the facility number parameter passed by application layer 12 into a local variable (step 210), validates the contents of the facility version parameter (step 212), and copies the contents of the facility version parameter into a local variable (step 214). If, however, the contents of the facility version parameter are found invalid (step 212), then INIT returns an error to the application layer 12 (step 216).

Having initialized and validated the contents of the required parameters passed by the application layer 12, INIT next determines if the application layer has been initialized (step 218), i.e., it uses the contents of the facility number and facility version parameters passed by the application layer to determine whether INIT has been called twice from the same layer within the application layer. To assist in this determination, the registrar process 14 maintains a facility list which contains a facility entry for each application layer that has called INIT and has thus been connected with the registrar. If INIT determines that the application layer has been initialized already, it returns a message to the application layer (step 220), indicating that INIT has already been called from the application layer. Finally, INIT next validates the contents of the registration identification parameter passed by the application layer 12 (step 222). If the identification is valid, INIT copies its contents into a local variable (step 224). Otherwise, if the identification is invalid, INIT returns an error to the application layer (step 226).

Next, having validated the contents of most of the parameters, INIT prepares any remaining parameters passed by the application 12 to receive information from the data collection. Specifically, INIT clears the event flags parameters and the item flags parameter passed by the application layer 12 by writing zeros into each of the flags (step 228) and by clearing the status parameter (step 230). Following steps 228 and 230, INIT constructs the resource name (FIG. 2) used to communicate messages from the application layer 12 to the registrar 14.

Next, INIT creates a temporary mailbox (step 234) for the application layer 12 which receives start and stop messages from the registrar 14 to control the data collection, e.g., messages to start or cancel a data collection. Then, if the facility is not already entered in the facility list, INIT adds a facility entry to the facility list (step 236). The facility entry is shown in block diagram form in FIG. 5 and includes a facility number 50, event flags 52, an address for the event flags 54, item flags 56, and an address for the item flags 58. Otherwise, INIT assigns values to the event flags 52 and item flags 56 (step 238).

In order to create a new facility entry in step 236, INIT first creates the entry and copies the contents of the facility version number parameter to the facility number field 50 of the entry. Likewise, INIT copies the contents of the identification parameter, the addresses of the event flags parameter, and the address of the item flags to their respective fields in the entry. Finally, INIT initializes the entry so that it is available for data collection, sends the facility entry information to the registrar, and sets a flag indicating that the facility has been registered.

If a collection is turned on for the current facility, a facility entry already exits. Therefore, INIT updates the existing facility entry as in step 238, or after creating the entry in step 236, INIT sets the contents of the event flags 52, sets the contents of the item flags 56, writes the entry to the data collection file 20, copies the contents of the identification and facility version parameters to the entry. Finally, INIT returns the status of the facility and its data collection to the application layer, e.g., SUCCESS or DISABLED (step 240).

EVENT Service Routine Call

EVENT is a service routine call instrumented at the occurrence of each asynchronous point event in the application layer 12. Its purpose is to record point event data in the data collection file 20. An example of the EVENT service routine call instrumented in a section of application code is provided below in "Code Example 2".

CODE EXAMPLE 2

```
/****************************************************************
****                                                            *
*       Facility:   DB - Database Facility
*
*       Module  :   DB$TRANS.C
*
*       Abstract:   Module handles transactions for use as a code
*                   example for issuing DECtrace service routine
*                   calls. This code example is an extension to the
*                   second that illustrates the most optimal way of
*                   collecting events.
*
*
*       Creation:       28-Jun-1989
*
****************************************************************
**/

/****************************************************************
*****           Header Files
****************************************************************
**/
#include <stdio.h>                  /* C standard I/O            */
#include <ctype.h>                  /* C type library            */
#include <stdlib.h>                 /* C standard library        */
#include <descrip.h>                /* VMS Descriptors           */

/****************************************************************
***
**          Macro definitions
****************************************************************
**/
#define FAC_NO 123                  /* Facility number */
#define TRNAS_EVENT_ID 1            /* Transaction event id */

/****************************************************************
***
**          Type definitions.
****************************************************************
**/
typedef struct item_flags_s
    {
    int offset1 : 32;
    int offset2 : 32;
    int offset3 : 32;
    int offset4 : 4;
    int bio_item : 1;               /*BIO item number 101 */
```

```c
   int dectrace rest : 27;
   } ITEM_FLAGS_T;

typedef struct e_record_buffer_s
   {
   int perf_item;                        /* Item number 2 */
   } E_RECORDER_BUFFER_T;

typedef struct p_record_buffer_s
   {
   int transaction_id; /* Item number 1 */
   } P_RECORD_BUFFER_T;

typedef struct s_record_buffer_s
   {
   int transaction_id; /* Item number 1 */
   int perf_item;                        /* Item number 2 */
   } S_RECORD_BUFFER_T;
/****************************************************************
*****           Variable declarations.
****************************************************************
**/static int s_evnet flags[128];        /* Event Flags array */
static ITEM_FLAGS_T s_event_item_flags[128];
                                         /*Event item flags array */ static $DESCRIPTOR(s_fac_ver,"V1.0-0");

/****************************************************************
***
        External References
****************************************************************
**/
globalvalue EPC$_NOTINSTALL;             /* DECtrace not installed message
*/
globalvalue EPC$_SUCCESS;                /* DECtrace success status */
                                         /* Facility version string */
/****************************************************************
***
**      Forward References
****************************************************************
***
int db$$main(void);                      /* Main program entry point      */
int transaction(void);                   /*Transaction function    */
/****************************************************************
***
*
*  Main Program.
*
****************************************************************
**/
int db$main ()
main_program
   {
   int status;                           /* Status Code */

/* Register with DECtrace */
   status = epc$init(1,
                                         /* EFN */
                     FAC_NO,              /* Facility number */
```

```
                &s_fac_ver,     /* Facility ver. string */
                0,              /* Registration id string */
                &s_event_flags, /* Event flags structure */
                &s_event_item_flags,/* Event item flags structure */
                0,              /* IOSB */
                0,              /* AST address */
                0);             /* AST parameter */ if ((status ! = EPC$_SUCCESS) && (status != EPC$_NOTINSTALL))
      {
        return (status);
      }
    status = transaction();

return (TRUE);

; /* End db$main */
/*********************************************************************
*
*           Transaction function.
*
**********************************************************************/
int transaction (void)
  { int             event_handle;  /* Event handle */
  E_RECORDER_BUFFER_T e_record_buffer;
                           /* The record buffer containing items for */
                           /* The transaction end duration event */
  P_RECORDER_BUFFER_T p_record_buffer;
                           /* The record buffer containing items for */
                           /* the transaction point event */
  S_RECORD_BUFFER_T s_record_buffer;
                           /* The record buffer containing items for */
                           /* the transaction start duration event */
  struct dsc$descriptor_s
              record_desc;   /* Descriptor for record buffer */ int           status;      /* Status Code */

/* Start of the TRANSACTION event */

/* Check to see if the TRANSACTION event should be collected */
if (s_event_flags[TRANS_EVENT_ID-1] != FALSE)
  {
if (s_event_item_flags[TRANS_EVENT_ID-1].bio_item != FALSE)
  {
            /* This transaction is a duration event */
            record_desc.dsc$b_class = DSC$K_CLASS_S;
            record_desc.dsc$w_length = sizeof(S_RECORD_BUFFER_T);
            record_desc.dsc$b_pointer = &s_record_buffer;
            /* Get the items for transaction event */
```

```
                        status = get items(&s_record buffer); */
                        /* Call EPC$START_EVENT for the start of the transaction
event */
                        status = epc$start_event)
                            1,                          /* EFN */
                            FAC_NO,                     /* Facility number */
                            TRANS_EVENT_ID,             /* Transaction event id */
                            &event_handle,              /* Event handle from start
event */
                            0,                          /* No thread context var */
                            &record_desc,               /* Facility items rec. buffer
*/
                            0,                          /* Completion status */
                            0,                          /* AST address */
                            0);                         /* AST parameter */ if ((status != EPC$_SUCCESS) && (status !=
EPC$_NOTINSTALL))
                            {
                                return (status);
                            }
                    } /* End Then */
else
                    {
                        /* This transaction is a point event */
                        record_desc.dsc$b_class = DSC$K_CLASS_S;
                        record_desc.dsc$w_length = size of(P_RECORD_BUFFER_T);
                        record_desc.dsc$a_pointer = &p_record_buffer;
                        /* Get the transaction id item for the transaction event
*/
                        status = get_trans id(&p_record_buffer); */
                        /* Call EPC$EVENT for the point event */
                        status = epc$event(
                                            1,          /* EFN */
                                            FAC_NO,     /* Facility
number */
                                            TRANS_EVENT_ID,    /*
Transaction event id */
                                            &event_handle,    /* Event
handle from start event */
                                            0,          /* No thread
context var */
                                            &record_desc,    /*
Facility items rec. buffer */
                                            0,          /* Completion
status */
                                            0,          /* AST address
*/
                                            0);         /* AST
parameter */ if ((status != EPC$_SUCCESS) && (status !=
EPC$_NOTINSTALL))
                            {
                                return (status);
                            }
                    } /* End Then */
```

```
} /* End Then */
/* End of the TRANSACTION event */

/* Check to see if the end of TRANSACTION event should be collected */
if ( (s_event_flags[TRANS_EVENT_ID-1] != FALSE) &&
if   (s_event_item_flags[TRANS_EVENT_ID-1].bio_item != FALSE)
  {
                /* This transaction is a duration event */
                record_desc.dsc$b_class = DSC$K_CLASS_S;
                record_desc.dsc$w_length = sizeof(S_RECORD_BUFFER_T);
                record_desc.dsc$b_pointer = &s_record buffer;
                /* Get the items for transaction event */
                status = get items(&s_record buffer); */
                /* Call EPC$START_EVENT for the start of the transaction
event */
                status = epc$start_event)
                                            1,  /* EFN */
                                            FAC_NO,  /* Facility number */
                                            TRANS_EVENT_ID, /* Transaction
event id */
                                            &event_handle, /* Event handle
from start event */
                                            0, /* No thread context var */
                                            &record_desc,   /* Facility
items rec. buffer */
                                            0, /* Completion status */
                                            0, /* AST address */
                                            0); /* AST parameter */ if ((status != EPC$_SUCCESS) && (status !=
EPC$_NOTINSTALL))
                {
                  return (status);
                }
            } /* End Then */ return (TRUE);

};  /* End transaction routine */
$ Collect
!
! Command and options to create the DB facility definition.
!
create definition db 123/version="V1.0-0"/replace/options
!
item TRANSACTION ID longword/id=1/report_headers="Transaction id"-
                                              /usage
type=level/characteristics=PRINTABLE
item PERF_ITEM longword/id=2/report_header="Perf item- /usage_type=counter/characteristics=PRINTABLE
!
event TRANSACTION/id=1/report_header="Transaction"-
/items=(transaction_id,perf_item,resource_items)
/start_event=(transaction_id,perf_item,resource_items)-
/end_event=(perf_item,resource_items)-
```

```
/point-event=(transaction_id)
!
class WORKLOAD transaction-
/items=(transaction_id)
!
class PERFORMANCE transaction-
/items=*
!
default_class PERFORMANCE
!
exit
!
!
! Show the facility definition for the DB facility
!
show definition db/format=full
!
!
!
! Create a facility selection for the DB facility using
! the WORKLOAD class of events and items.
!
create selection code_example_sel3/replace/options
facility db/class=workload
exit
!
!
!
! Schedule data collection, referencing facility selection
! CODE_EXAMPLE_SEL3. Collection will start NOW and end in 2 hours.
!
schedule collection code_example_coll3 dcf.dat-
/selection=code_example_sel3-
/duration=02:00:00.00-
/nocluster
!
! Run the program and collect the data.
!
$ Run DB$TRANS.EXE
!
!
$ Collect
!
! Format the data into an Rdb/VMS database.
!
format dcf.dat code_example3_db
!
!
!
! Generate a DETAIL report.
!
report/type=DETAIL/facility=db code_example3_db
```

Figure 6:
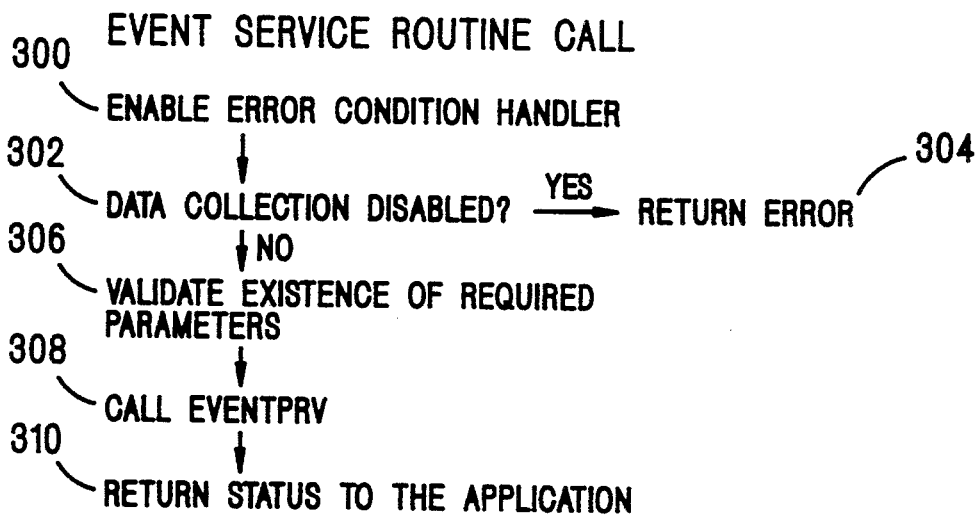
FIG. 6 is a flow chart describing the operation of a service routine call of Collector, i.e., EVENT.

In addition, the operation of EVENT when called by the application layer 12 is illustrated in the flow chart of Fig. 6. First, EVENT enables an error condition handler In addition, the operation of EVENT when called by the application layer 12 is illustrated in the flow chart of FIG. 6. First, EVENT enables an error condition handler (step 300) to respond to any errors in the parameters passed by the application layer 12 when it calls the routine. Next, EVENT determines if data collection is disabled (step 302). If data collection is disabled, then EVENT returns an error to the application layer 12 (step 304). Otherwise, EVENT validates the required parameters in the list of parameters (step 306) and calls another service routine EVENTPRV (step 308), which validates the contents of the parameters and writes the contents to the facility entry. (EVENTPRV is described below in connection with FIG. 8.) Finally, EVENT returns the status of the call to the application layer (step 310).

Analogously, EVENTW is a service routine call instrumented at the occurrence of each synchronous point event in the application layer 12. Its purpose is to record synchronous point event data in the data collection file 20. An example of the EVENTW service routine call instrumented in a section of application layer code is provided above "Code Example 2". In addition, the operation of EVENTW when called by the application layer 12 is illustrated in the flow chart of FIG. 7 and described below.

Figure 7:
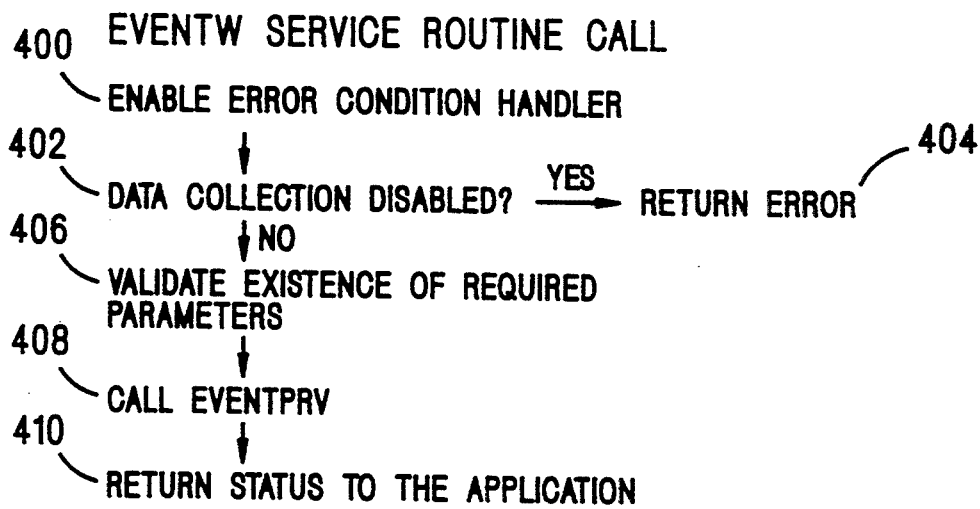
FIG. 7 is a flow chart describing the operation of a service routine call of Collector, i.e., EVENTW.

Referring to FIG. 7, EVENTW first enables an error condition handler (step 400) to respond to any errors in the parameters passed by the application layer 12 when it calls the routine. Then EVENTW determines if data collection is disabled (step 402). If data collection is disabled, then EVENTW returns an error to the application layer 12 (step 404). Otherwise, EVENTW validates the contents of one or more of the parameters in the list of parameters (step 406) and calls the service routine EVENTPRV (step 408) which validates the contents of the parameters and writes the contents to the facility entry. (EVENTPRV is described below in connection with FIG. 8.) Finally, EVENTW returns the status of the call to the application layer (step 410).

EVENTPRV Service Routine Call

EVENTPRV is a routine called by the EVENT and EVENTW as described above. Its purpose is to enter data collected in the event service routines in the facility entries. To do this, EVENTPRV takes the contents of the parameters it receives from the event service routines, validates them, and copies them into the facility entry. The operation of EVENTPRV is described below in connection with the flow chart of FIG. 8.

Figure 8:
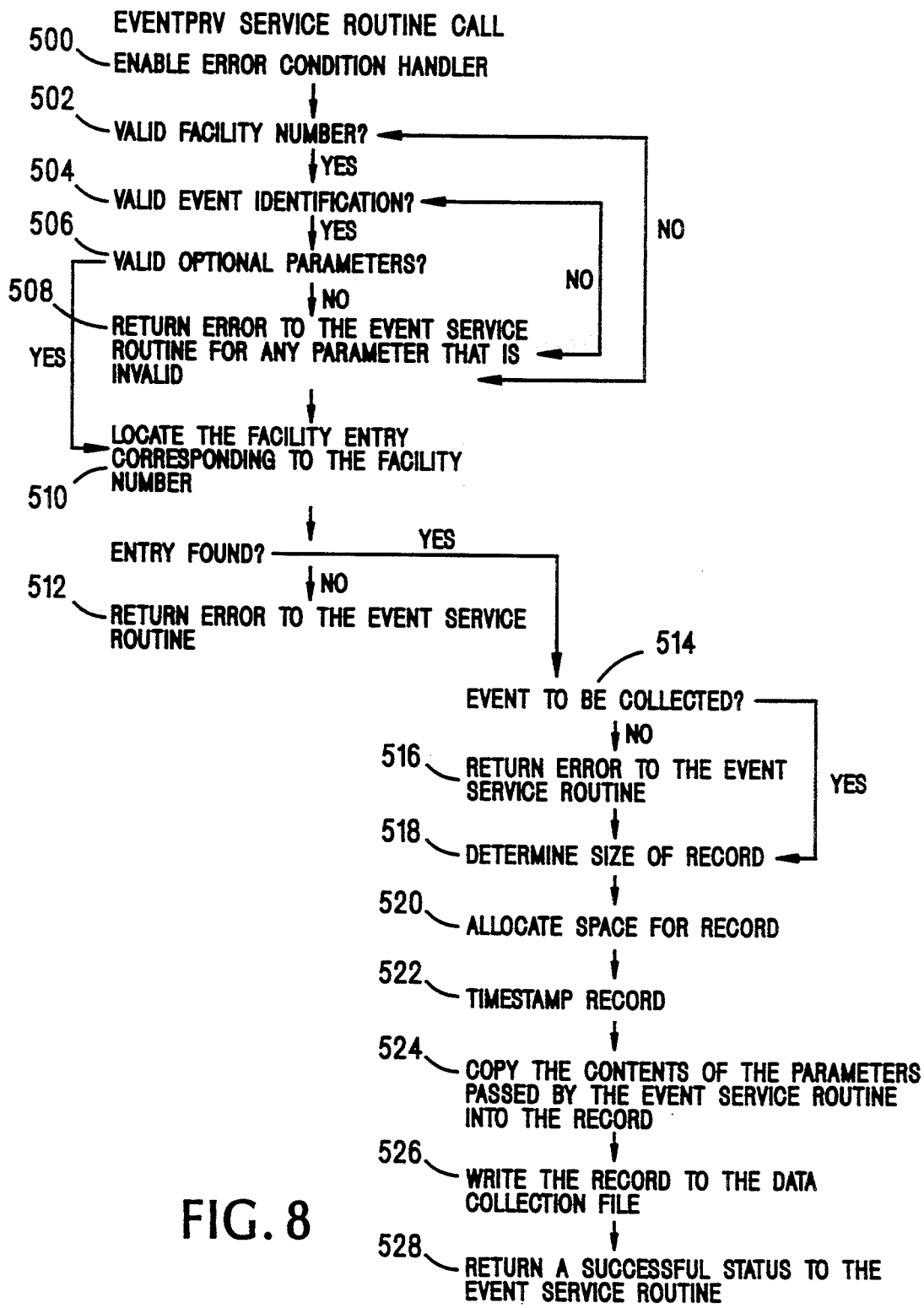
FIG. 8 is a flow chart describing the operation of a service routine call of Collector, i.e., EVENTPRV.

Referring to FIG. 8, EVENTPRV first enables an error condition handler (step 500) to respond to any errors in the parameters passed by the event service routines. Next, EVENTPRV validates the contents of the facility number parameter (step 502), the contents of the event identification (step 504), and the contents of any optional parameters (step 506). Then EVENTPRV validates each of the optional parameters (step 508), and returns an error to the event service routine for any parameter that is invalid.

Having validated the parameters, EVENTPRV next locates the facility entry corresponding to the facility number parameter passed by the event service routine (step 510). If there is no facility entry, EVENTPRV returns an error to the event service routine (step 512). Otherwise, EVENTPRV determines if the event is to be collected (step 514), i.e., whether the flag for the event is set. If the event is not to be collected, EVENTPRV returns an error to the event service routine (step 516). Otherwise, EVENTPRV determines the size of the record needed to hold the collected data (step 518), allocates the space for that record (step 520), and timestamps the record (step 522). Having thus prepared the record, EVENTPRV then copies the contents of the parameters passed by the event service routine into the record (step 524), writes the record to the data collection file 20 (step 526), and returns a successful status, i.e., SUCCESS, to the event service routine (step 528).

START_EVENT Service Routine Call

START_EVENT is a service routine call instrumented at the start of each asynchronous duration event in the application layer 12. Its purpose is to record asynchronous duration event data in the data collection file 20. An example of the START_EVENT service routine call instrumented in a section of application code is provided above in "Code Example 1." In addition, the operation of START_EVENT when called by the application layer 12 is illustrated in the flow chart of FIG. 9 and described below.

Figure 9:
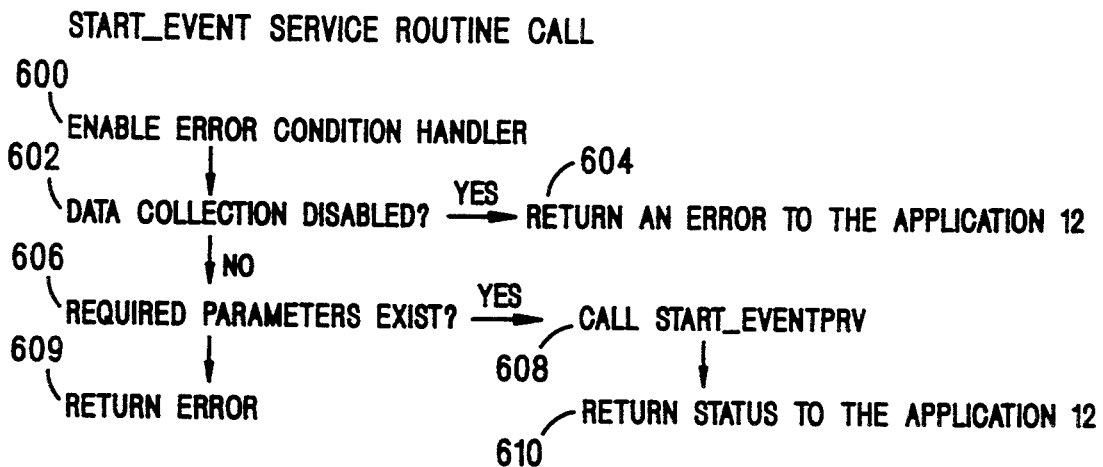
FIG. 9 is a flow chart describing the operation of a service routine call of Collector, i.e., START_EVENT.

Referring to FIG. 9, START_EVENT first enables an error condition handler (step 600) to respond to any errors in the parameters passed by the application layer 12. Next, START_EVENT determines if data collection is disabled (step 602). If data collection is disabled, then START_EVENT returns an error to the application layer 12 (step 604). Otherwise, START_EVENT validates the required parameters (step 606) and calls the routine START_EVENTPRV (step 608) which is described below in connection with FIG. 11. Finally, START_EVENT returns a status to the application layer 12 (step 610).

Analogously, START_EVENTW is a service routine call instrumented at the start of each synchronous duration event in the application layer 12. Its purpose is to record synchronous duration event data in the data collection file 20. An example of the START_EVENTW service routine call instrumented in a section of application layer code is provided above "Code Example 1". In addition, the operation of START_EVENTW when called by the application layer 12 is illustrated in the flow chart of FIG. 10 and described below.

Figure 10:
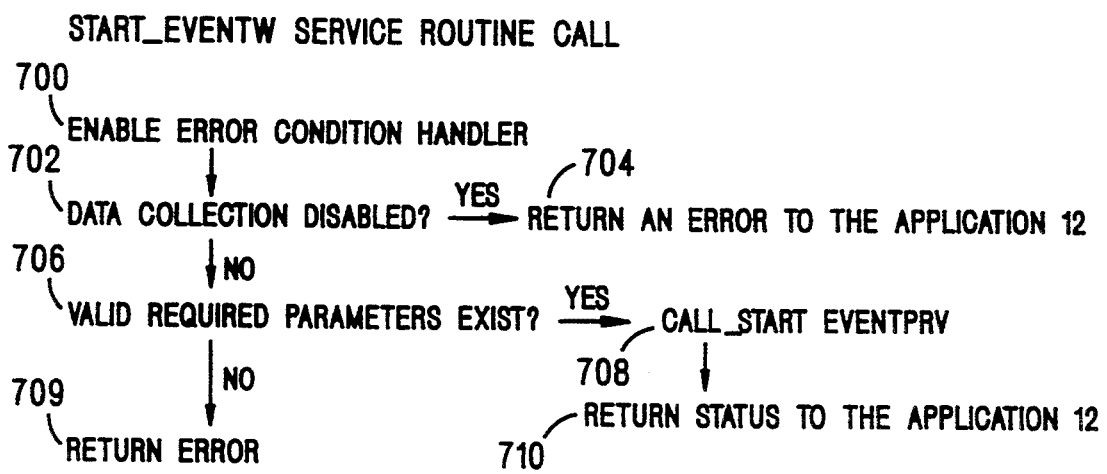
FIG. 10 is a flow chart describing the operation of a service routine call of Collector, i.e., START_EVENTW.

Referring to FIG. 10, START EVENTW first enables an error condition handler (step 700) to respond to any errors in the parameters passed by the application layer 12. Next, START_EVENTW determines if data collection is disabled (step 702). If data collection is disabled, then START_EVENTW returns an error to the application layer 12 (step 704). Otherwise, START_EVENTW validates the contents of the required parameters (step 706) and calls the routine START_EVENTPRV (step 708) which is described below in connection with FIG. 11. Finally, START_EVENTW returns a status to the application layer 12 (step 710).

START_EVENTPRV Service Routine Call

Figure 11:
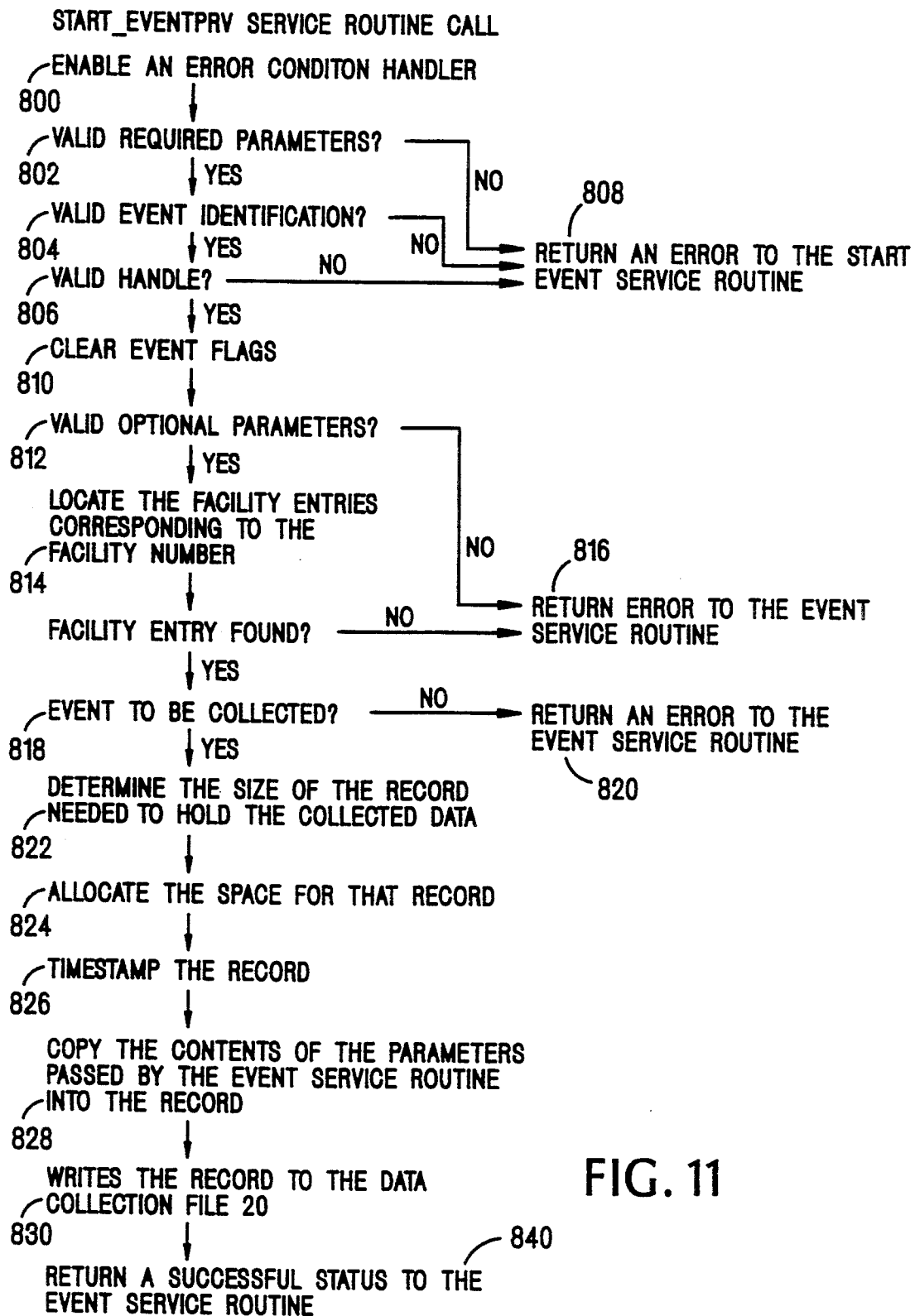
FIG. 11 is a flow chart describing the operation of a service routine call of Collector, i.e., START_EVENTPRV.

Referring to FIG. 11, START_EVENTPRV first enables an error condition handler (step 800) to respond to any errors in the parameters passed by the start event service routines. Next, START_EVENTPRV validates the contents of the required parameters (step 802), i.e., the facility number parameter, the contents of the event identification (step 804), and the contents of the handle (step 806). In response to these tests, START_EVENTPRV returns an error to the start event service routine for any of these parameters that is invalid (step 808). Next, START_EVENTPRV clears the operating system's event flag (step 810), and validates the contents of any optional parameters (step 812).

Having validated the parameters, START_EVENTPRV next locates the facility entry corresponding to the facility number parameter passed by the event service routine (step 814). If there is no facility entry, START_EVENTPRV returns an error to the event service routine which indicates that data is not being collected for the facility (step 816). Otherwise, START_EVENTPRV determines if the event is to be collected (step 818), i.e., whether the flag for the event is set. If the event is not to be collected, START_EVENTPRV returns an error to the event service routine (step 820). Otherwise, START_EVENTPRV determines the size of the record needed to hold the collected data (step 822), allocates the space for that record (step 824), and timestamps the record (step 826). Having thus prepared the record, START_EVENTPRV then copies the contents of the parameters passed by the event service routine into the record (step 828), writes the record to the data collection file 20 (step 830), and returns a successful status, i.e., SUCCESS, to the event service routine (step 840).

END_EVENT Service Routine Call

END_EVENT is a service routine call instrumented at the end of each asynchronous duration event in the application layer 12. Its purpose is to record duration event data in the data collection file 20. An example of the END_EVENT service routine call instrumented in a section of application layer code is provided above in "Code Example 1". In addition, the operation of END_EVENT when called by the application layer 12 is illustrated in the flow chart of FIG. 12 and described below.

Figure 12:
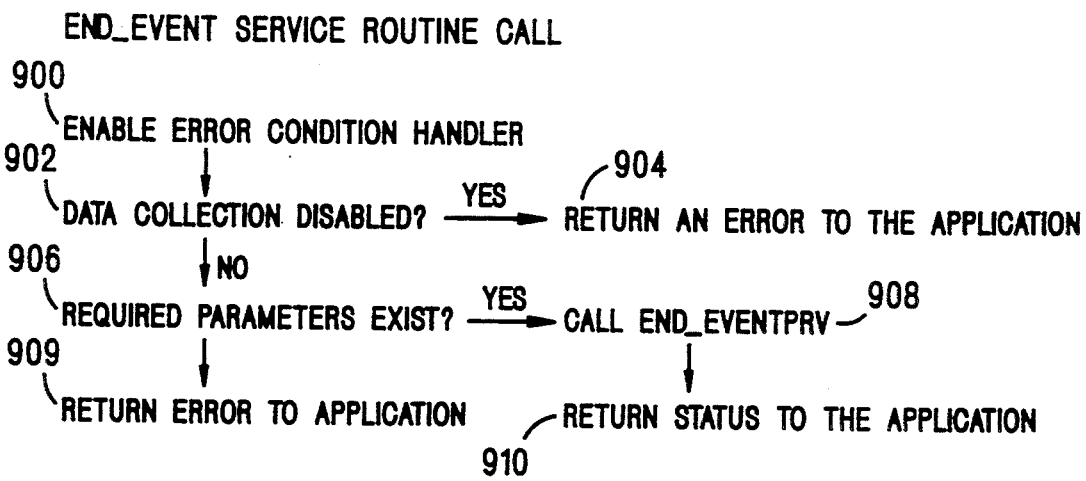
FIG. 12 is a flow chart describing the operation of a service routine call of Collector, i.e., END_EVENT.

Referring to FIG. 12, END_EVENT first enables an error condition handler (step 900) to respond to any errors in the parameters passed by the event service routines. Next, END_EVENT determines if data collection is enabled (step 902). If data collection is disabled, then END_EVENT returns an error to the application layer 12 (step 904). Otherwise, END_EVENT validates the required parameters (step 906). If the required parameters exist, END_EVENT calls the routine END_EVENTPRV (step 908) which is described below in connection with FIG. 14. Otherwise, END_EVENT returns an error to the application layer 12 (step 909). Finally, END_EVENT returns a status to the application layer 12 (step 910).

Analogously, END_EVENTW is a service routine call instrumented at the end of each synchronous duration event in the application layer 12. Its purpose is to record duration point event data in the data collection file 20. An example of the END_EVENTW service routine call instrumented in a section of application code is provided above in "Code Example 1". In addition, the operation of END_EVENTW when called by the application layer 12 is illustrated in the flow chart of FIG. 13 and described below.

Figure 13:
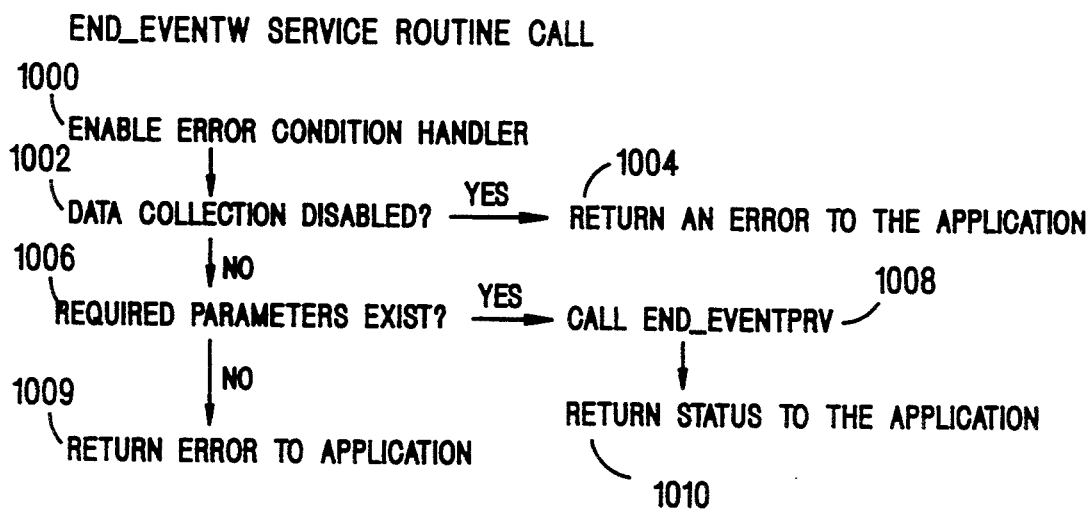
FIG. 13 is a flow chart describing the operation of a service routine call of Collector, i.e., END_EVENTW.

Referring to FIG. 13, END_EVENTW first enables an error condition handler (step 1000) to respond to any errors in the parameters passed by the event service routines. Next, END_EVENTW determines if data collection is enabled (step 1002). If data collection is disabled, then END_EVENT returns an error to the application layer 12 (step 1004). Otherwise, END_EVENTW checks for the existence of the required parameters (step 1006). If the required parameters exist, END_EVENT calls the routine END_EVENTPRV (step 1008) which is described below in connection with FIG. 14. Otherwise, END_EVENT returns an error to the application layer 12 (step 1009). Finally, END_EVENT returns a status to the application layer 12 (step 1010).

END_EVENTPRV Service Routine Call

END_EVENTPRV is a service routine called by the routines END_EVENT and END_EVENTW as described above. Its purpose is to store data collected by the end event service routines in the facility entries. To do this, END_EVENTPRV takes the contents of the parameters it receives from the end event service routines, validates them, and copies them into the facility entry. The operation of EVENTPRV is described below in connection with the flow chart of FIG. 14.

Figure 14:
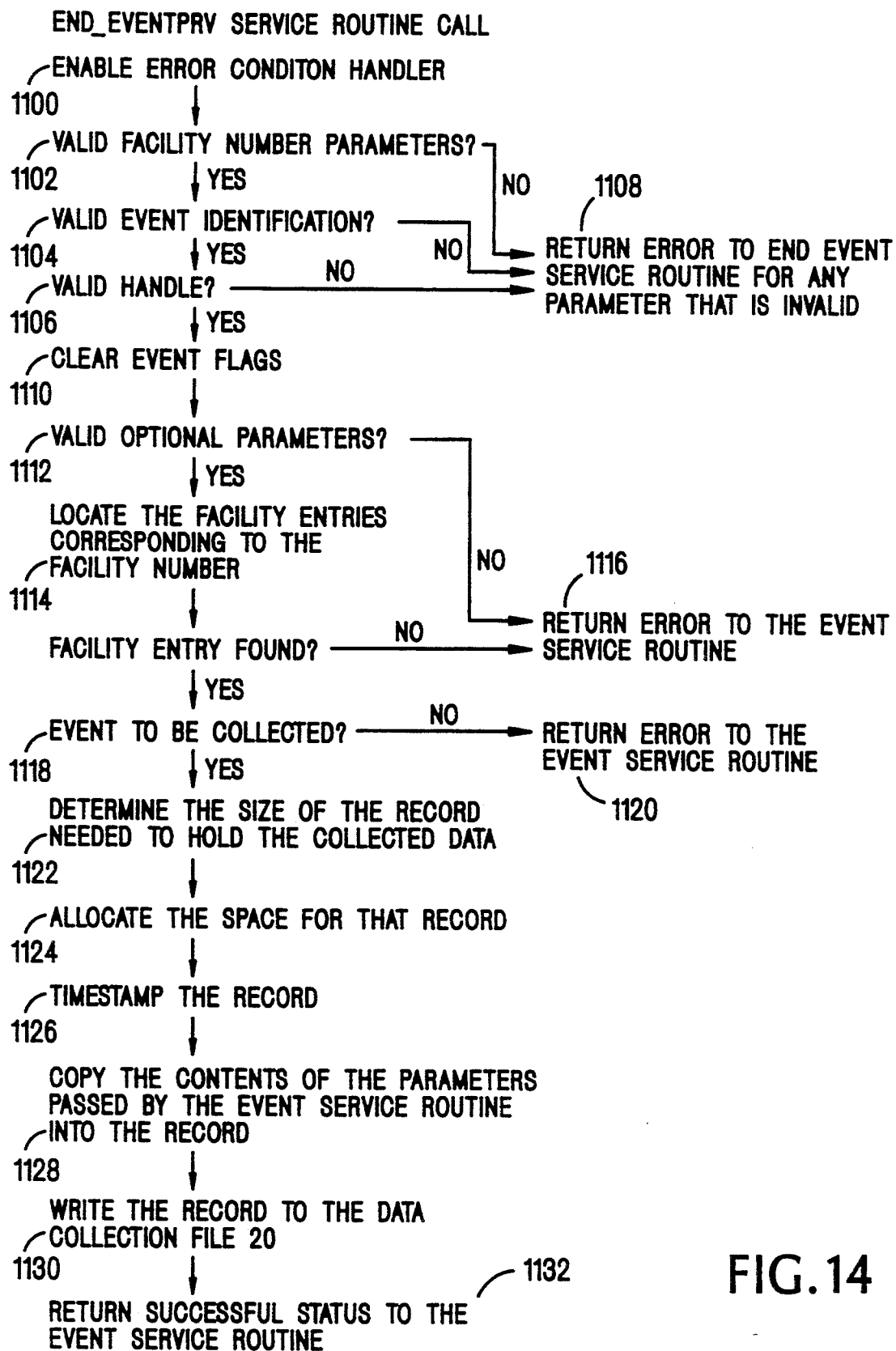
FIG. 14 is a flow chart describing the operation of a service routine call of Collector, i.e., END_EVENTPRV.

Referring to FIG. 14, END_EVENTPRV first enables an error condition handler (step 1100) to respond to any errors in the parameters passed by the end event service routines. Next, END_EVENTPRV validates the contents of the facility number parameter (step 1102), the contents of the event identification (step 1104), and the contents of the handle (step 1106). END_EVENTPRV returns an error to the end event service routine for any of these parameters that is invalid (step 1108). Next, END_EVENTPRV clears the event flags (step 1110), and validates the contents of any optional parameters (step 1112). Next, END_EVENTPRV locates the facility entry corresponding to the facility code parameter passed by the event service routine (step 1114). If there is no facility entry, END_EVENTPRV returns an error to the event service routine (step 1116). Otherwise, END_EVENTPRV determines if the event is to be collected (step 1118), i.e., whether the flag for the event is set. If the event is not to be collected, END_EVENTPRV returns an error to the event service routine (step 1120). Otherwise, END_EVENTPRV determines the size of the record needed to hold the collected data (step 1122), allocates the space for that record (step 1124), and timestamps the record (step 1126). Having thus prepared the record, END_EVENTPRV then copies the contents of the parameters passed by the event service routine into the record (step 1128), writes the record to the data collection file 20 (step 1130), and returns a successful status, i.e., SUCCESS, to the event service routine (step 1132).

Facility Definition

Figure 15:
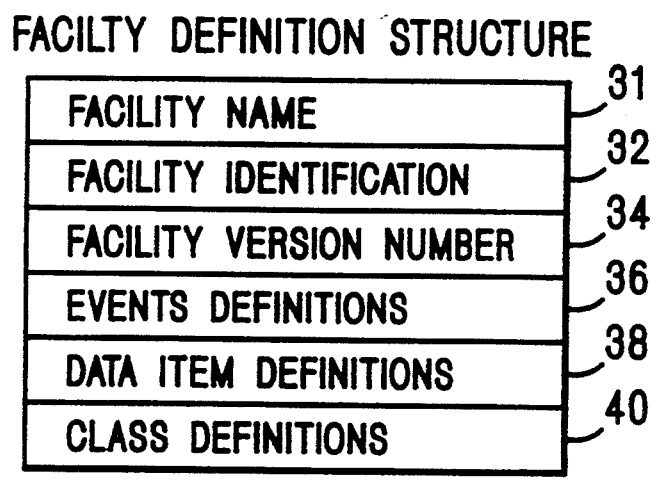
FIG. 15 is a block diagram of a facility definition data structure.
Figure 16:
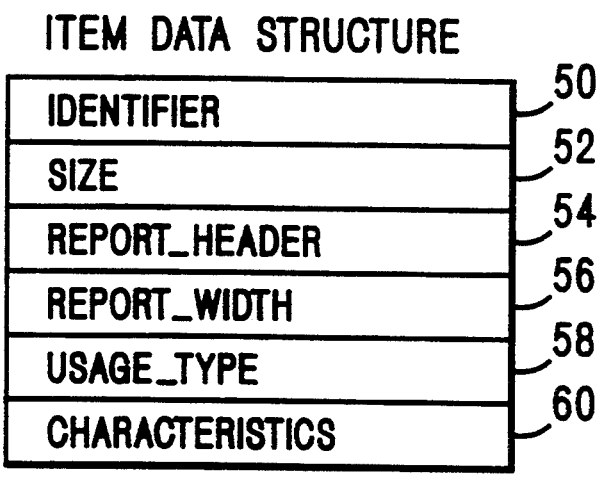
FIG. 16 is a block diagram of an item data structure.

Each application layer 12 that is instrumented with service routine calls to the registrar process 14 must provide a facility definition which describes the events in the application layer and also the data items for each event. The facility definition is stored in the administration database 16 and accessed by the user via the registrar 14 and the schedule user interface 18 in order to accomplish data collection. A facility definition (shown in block diagram in FIG. 15) includes the name of the facility 30, the identification number of the facility 32, the version number of the facility 34, a list of event definitions 36, a list of data item definitions 38 associated with each event, and a list of class descriptions 40. In the example application layer for the ATM, the defined events 36 are checking an account balance, depositing funds, withdrawing funds (all duration events), and displaying an error message (a point event). The code for each event is instrumented by placing service routine calls at its beginning and its end. The data items 38 are pieces of data associated with each event. By default the items shown in Table 1 above are collected for every event. The user, however, can choose to collect additional application layer specific items or to skip any of the standard items. The structure of a data item is shown in FIG. 16. Each item is defined in part by its data type (see Table 3 below for a list of possible data types), and is further defined by an identifier 50; a size 52, which indicates the maximum size in bytes of the item; a report header 54, which is text used to label the item in a report; a width 56, which indicates the number of spaces in which to display the item in a report; a usage type 58, which can have one of several values, including LEVEL, COUNTER, PERCENT, TEXT, and PRIVATE (see Table 4 below for a list and explanation of usage types); and a characteristic 60, which indicates, for example, whether the item is printable or nonprintable.

TABLE 3

| | |
|---|---|
| ASCIC | Varying length counted string of up to 255 bytes |
| ASCIW | Varying length counted string of up to 16383 bytes |
| BYTE | Signed byte |
| FIXED_ASCIC | Fixed length counted string of up to 255 bytes |
| LONGWORD | Signed longword (4 bytes) |
| QUADWORD | Signed quadword (8 bytes) |
| WORD | Signed word (2 bytes) |

TABLE 4

| | |
|---|---|
| COUNTER | Typically a running count or total |
| LEVEL | A meter or gauge that indicates the current value of some metric |
| PERCENT | A percentage, similar to LEVEL, except that it has upper and lower limits |
| PRIVATE | Facility-defined data that does not fall into any other category |
| TEXT | Text characters |

Finally, the list of class definitions 40 identifies sets of events definitions 36 and data item definitions, which a user can select as a group in a facility selection described below.

Facility Selection

Figure 17:
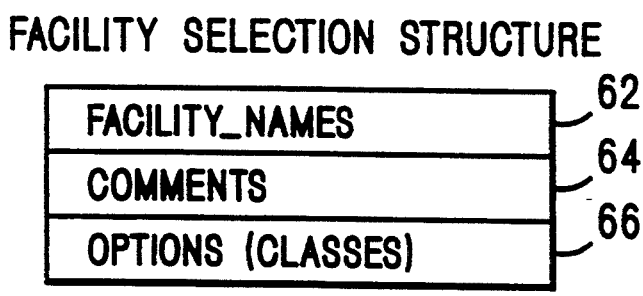
FIG. 17 is a block diagram of a facility data structure.

A facility selection describes the data for the events and items that each application layer 12 gathers during a collection. The collection tool 10 performs data collection with minimal overhead and performance impact. However, the overhead of course increases as the user selects more and more facilities from which to collect data. For example, in a busy environment, the data collection file 20 becomes very large, which can cause the application layer to quickly use up available disk space. Therefore, the user can choose to limit his collection to a specific function or area of the application layer. To do this, he selects one or more of the classes from the facilities described above. The structure of a facility selection is shown in FIG. 17 and includes a list of facility names of facility definitions 60 from which to collect data on events and items, a comment 62 which describes the purpose of the collection, and a list of options 64 which specify which classes from each facility.

Figure 18:
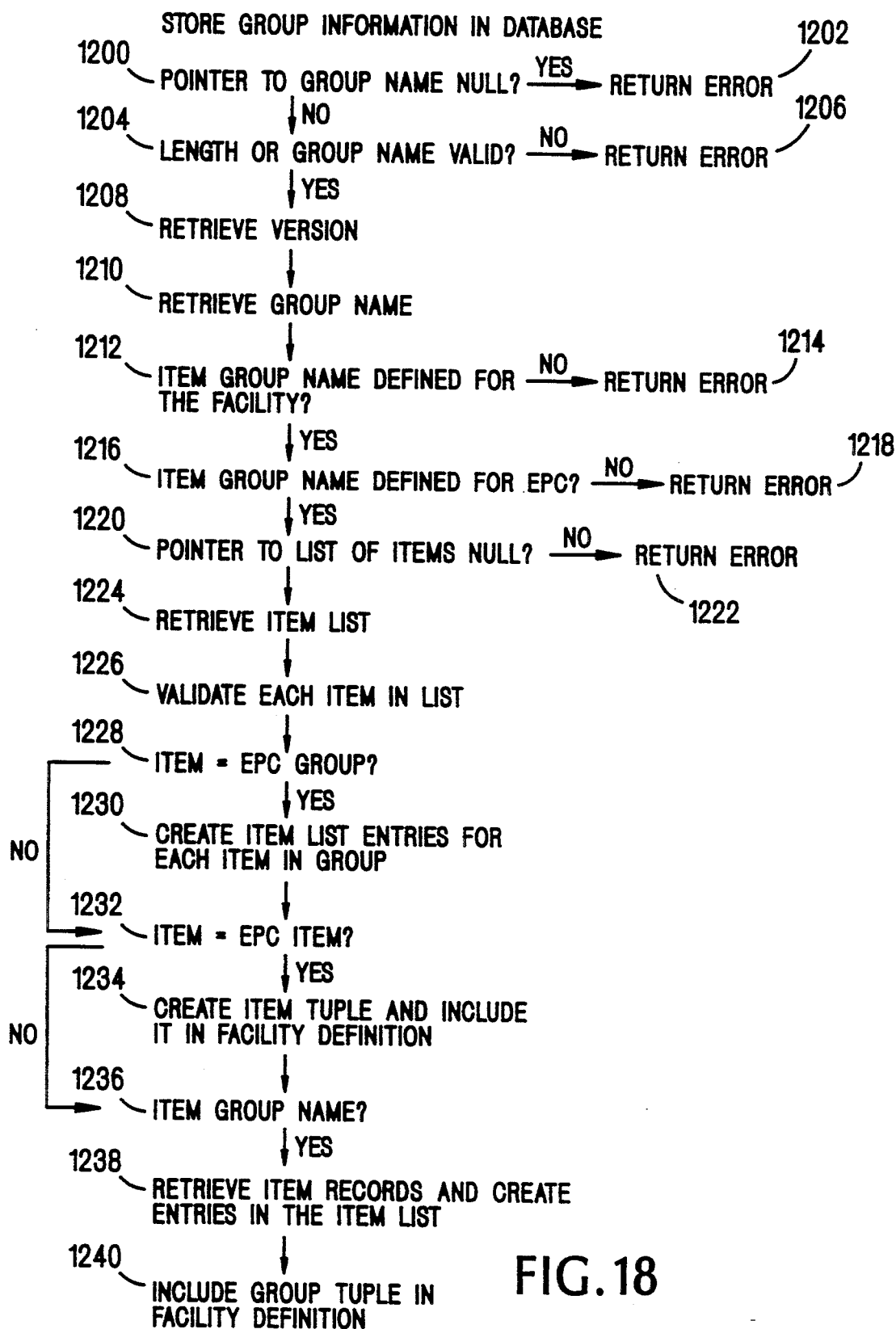
FIG. 18 is a flow chart describing the operation of store group data, one aspect of the facility selection process.

Information stored in the administration database becomes a part of a facility selection according the facility selection routine shown in the flow chart of FIG. 18. Inputs to the facility selection process are an item and item group information already in the database, one or more Facility Definitions, a facility identification, a pointer to version number of the facility, a pointer to the group names, and a pointer to list of items. If, in step 1200, the pointer to group name is null, the routine returns an error to the user interface. Otherwise, the routine determines if the length of the group name is valid (step 1202). If so, the routine retrieves the version number and group name (step 1204).

Next, the routine performs a number of error checks. If an item name is not defined for the facility (step 1206), the routine returns an error to the user interface (step 1208). Likewise, if an item group name is not defined for the facility (step 1210), the routine returns an error (step 1212). Finally, if the pointer to list of items is null (step 1214), the routine returns an error to the user interface (step 1216).

Otherwise, if the error checks do not return errors in steps 1206–1216, the routine retrieves the item list (step 1218) and validates each item in list (step 1220). If any item is a collector item group (step 1222), the routine creates item list entries for each item in group (step 1224). On the other hand, if any item is a collector item (step 1226), e.g., one of the standard resource items, creates an item tuple for the item and includes the tuple in facility definition (step 1228). And if any item is a group name (step 1230), the routine retrieves the item records (step 1232), create entries in the item list (step 1234), and includes a group tuple in facility definition (step 1236). Finally, the routine checks to see if a class option was entered. If so, the routine validates the class name and the existence of the events and any items to be associated with each event. If these exist, then the routine creates a class tuple for the class and event item tuples for the class. Whether or not a class was entered, a default class ALL is created, which contains all of the events and items for all of the events.

Schedule Interface

In order to collect data from the various applications and application layers running on a system, the user schedules a collection via the schedule user interface 18 (FIG. 2). In the scheduled collection, the user specifies which data to collect, how much data to collect, when to collect the data, and where to store the data. The amount of data collected depends on how many processes on each node of the system are collecting data. The user can select a subset or all of these processes.

Each layer in each application that contains service routine calls includes a call to INIT which registers the process and facility information. This information includes the name of the image, the name(s) of the facilities that called INIT, the registration identifier for the process, the process identification number, and the name of the node on which the process is running. The schedule information further includes the name of the output file for the collected data, the start and end times, which facility selection to use, and whether to collect from every node in a computer system, e.g., every node in a VAXcluster, or from a single local node.

Figure 19:
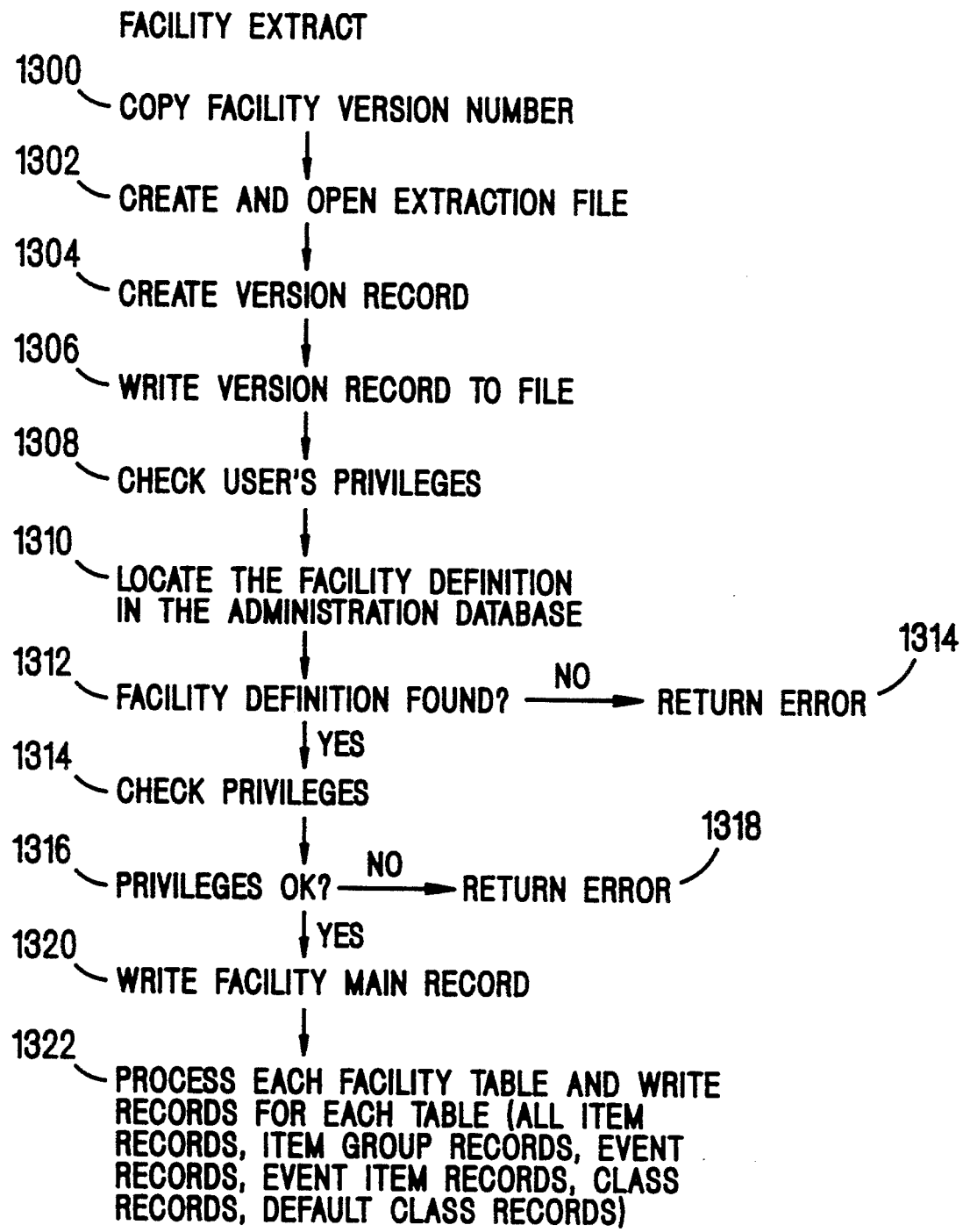
FIG. 19 is a flow chart describing the operation of facility extract, one aspect of the schedule collection process.

One routine necessary to export a facility definition to external computer systems is the Facility Extract routine shown in the flow chart of FIG. 19 which inputs a facility definition from the administration database and outputs a file containing a representation of that definition. First, the routine copies the facility version number (step 1300) and creates and opens the extraction file (step 1302). Having created the extraction file, the routine next creates a version record (step 1304) within the file, and writes version record from the database to the file (step 1306).

Next, the routine checks the user's privileges (step 1308). If the user's privileges are sufficient to meet a predefined standard, the routine attempts to locate the facility definition in the administration database (step 1310). If the facility definition is not found (step 1312), then the routine returns an error (step 1314). Otherwise, if the facility definition is found, the routine again check the user's privileges (step 1316). If the privileges are not sufficient, the routine returns an error (step 1318). Otherwise, the routine writes the facility main record (step 1320) to the extraction file by processing each facility table and writing the records for each of the item records, item group records, event records, event item records, class records, and default class records to the file (step 1322).

Formatting Data Collection File

After a scheduled data collection is completed, the data collection file 20 can be merged with previously created data collection files to form a single data file, e.g., a Rdb/VMS database file or a VMS RMS file. Thus, the user can conveniently maintain all of the data for one or more collections. Having formatted the data, the collector can also generate several tabular reports from the formatted data. For example, a Detail Report is useful to application programmers for debugging purposes since it shows the actual values of items for each occurrence of a duration event or point event, the time each event occurred, and other item data. Other reports include a Frequency Report which lists the number of occurrences of each event per second, per minute, or per hour, and a Summary Report which lists different statistics for each item, including maximum, minimum, mean, standard deviation, count (number of occurrences), total, and 95th percentile.

The source code for the application event collector (supplied in microfiche form in Appendix A and incorporated herein by reference) embodies the software modules described above. The programming languages used are VAX C version 3.0-031 and VAX BLISS-32 version 4.5-862. The computer used is a VAX 8820 and the operating system used is VAX/VMS 5.2.

A portion of the disclosure of this patent document contains material which is subject to copyright protection. The copyright owner has no objection to the facsimile reproduction by anyone of the patent document as it appears in the Patent and Trademark Office files, but otherwise reserves all copyright rights whatsoever.

Other embodiments are within the following claims.

I claim:

1. A computer implemented process for collecting event-based data for a software application, the process comprising the steps of:
   prior to execution of the software application:
   (a) embedding event-marking instructions in the software application, each of said event marking instructions having an enabled state in which event-based data is collected, and a disabled state in which event-based data is not collected; and
   (b) storing definitions of each of said event-marking instructions that have been embedded in the software application, said definitions identifying the software application in which the corresponding event-marking instructions are embedded, each of said definitions identifying a type superset of possible types of event-based data that may be collected by the corresponding event-marking instructions, each of said types including a corresponding item superset of possible items of event-based data that may be collected for said each type;
   after embedding of the event-marking instructions in the software application, and prior to or during execution of the software application:
   (c) selecting a subset of event-marking instructions, said subset including one or more but fewer than all of the event-marking instructions already embedded in the software application;
   (d) selecting, for each of said selected event-marking instructions in said subset, a type selection of one or more and in some cases fewer than all of said possible types of event-based data to be collected from said type superset in the corresponding definition, and for each of said selected types, an item selection of one or more and in some cases fewer than all of said possible items of event-based data to be collected from said item superset in the corresponding definition;
   (e) selecting, for each of said selected event-marking instructions in said subset, a time period for collection of said selected items of event-based data; and
   (f) placing each of said selected event-marking instructions in said subset in said enabled state; and
   during execution of the software application:
   (g) detecting each of said selected event-marking instructions in said enabled subset and collecting each of said selected items of each of said selected types of event-based data specified by said type selection and said item selection, at times falling within said selected time period.

2. Computer software for enabling a computer system to carry out a process of collecting event-based data for a software application, the process comprising the steps of:
   prior to execution of the software application:
   (a) storing definitions of event-marking instructions that have been embedded in the software application, each of said event-marking instructions having an enabled state in which event-based data is collected, and a disabled state in which event-based data is not collected, said definitions identifying the software application in which the corresponding event-marking instructions are embedded, each of said definitions identifying a type superset of possible types of event-based data that may be collected by the corresponding event-marking instructions, each of said types including a corresponding item superset of possible items of event-based data that may be collected for said each type;

after the event-marking instructions have been embedded in the software application, and prior to or during execution of the software application:

(b) selecting a subset of event-marking instructions, said subset including one or more but fewer than all of the event-marking instructions already embedded in the software application;

(c) selecting, for each of said selected event-marking instructions in said subset, a type selection of one or more and in some cases fewer than all of said possible types of event-based data to be collected from said type superset in the corresponding definition, and for each of said selected types, an item selection of one or more and in some cases fewer than all of said possible items of event-based data to be collected from said item superset in the corresponding definition;

(d) selecting, for each of said selected event-marking instructions in said subset, a time period for collection of said selected items of event-based data; and (e) placing each of said selected event-marking instructions in said subset in said enabled state; and during execution of the software application:

(f) detecting each of said selected event-marking instructions in said enabled subset and collecting each of said selected items of each of said selected types of event-based data specified by said type selection and said item selection, at times falling within said selected time period.

3. The process of claim 1 or 2 wherein the event marking instructions include a collection disabling instruction embedded in the software application for disabling all collection of said event-based data by all said event-marking instructions in the software application.

4. The process of claim 1 or 2 wherein the software application comprises a plurality of layers of software, and each of said layers may have event-marking instructions embedded in it.

5. The process of claim 4 wherein the definitions of the event-marking instructions include identification of the software layer in which the event-marking instruction is embedded.

6. The process of claim 1 or 2 wherein the definitions include classes of said event-marking instruction and said types of event-based data items that may be selected.

7. The process of claim 1 or 2 wherein the definitions of said event-marking instructions and the selections of said event-marking instructions are stored in a database.

8. The process of claim 1 or 2 wherein said event-based data collected by said event-marking instructions is stored in disk storage.

9. The process of claim 1 or 2 further adapted for collecting event-based data for multiple software applications, and wherein said steps of selecting, placing, and detecting are performed separately, simultaneously, and selectively with respect to each of said multiple software applications.

* * * * *